Patented Sept. 29, 1953

2,653,862

UNITED STATES PATENT OFFICE 2,653,862

MONOISOPROPYL AMINE AS AN OCTANE IMPROVER OF LEADED GASOLINE

Harold M. Trimble, Leo A. McReynolds, and Bill Mitacek, Bartlesville, Okla., assignors to Phillips Petroleum Company, a corporation of Delaware No Drawing. Application March 3, 1949, Serial No. 79,512

5 Claims. (Cl. 44—69)

This invention relates to an improved fuel composition for internal combustion engines. In one of its more specific aspects it relates to a fuel having a superior antiknock rating over a broad range of fuel-air ratios and compression ratios. In another of its more specific aspects it relates to an improved method for operating internal combustion engines requiring a fuel having both a high lean mixture and high rich mixture antiknock rating.

There are several types of internal combustion engines and in general, each type is designed for some specific use. Each type, however, is usually required to operate over a broad range of conditions, such as speed, power output, etc. Providing a fuel which will give satisfactory operation for any type of spark ignition internal combustion engine over its range of operating conditions has been a very difficult problem. Heretofore it has been impossible to provide one universal fuel which is satisfactory for all types of spark ignition internal combustion engines. The majority of the fuels for internal combustion engines comprises blends or mixtures of various petroleum hydrocarbons and usually contain minor amounts of metal organic antiknock additives. It is known that each class of petroleum hydrocarbons exhibits relatively definite antiknock characteristics, for example, isoparaffins have a higher antiknock rating than the corresponding normal paraffins. More recently it has been learned that given classes of hydrocarbons exhibit different antiknock ratings as the fuel-air ratio is varied. The problem has also been further complicated by the discovery that all of the cylinders of a given engine do not operate under the same fuel-air ratio and in some cases the fuel composition varies from cylinder to cylinder. Under these circumstances some of the cylinders may be operating under rich mixture conditions but the knock limited power output of the engine may be limited by one or more cylinders which are operating under lean mixture conditions.

An object of this invention is to provide a new fuel composition. Another object of the invention is to provide a fuel having an improved antiknock rating under both lean mixture and rich mixture conditions in a supercharged aviation spark ignition internal combustion engine. Another object of the invention is to provide a fuel having an improved antiknock rating under both lean mixture and rich mixture conditions in a spark ignition internal combustion automotive engine. Another object of the invention is to provide a spark ignition internal combustion engine fuel of increased sensitivity. Another object of the invention is to provide an improved method of operating a spark ignition internal combustion engine. Other and further objects and advantages will be apparent upon study of the accompanying disclosure.

The method which is generally used for determining the antiknock quality of an automotive fuel in the laboratory is the ASTM Standard Method of Test for Knock Characteristics of Motor Fuel by the Motor Method, ASTM designation D357. This test method is commonly referred to as the Motor method. Another laboratory method which is widely used is the Tentative Method of Test for Knock Characteristics for Motor Fuel by the Research Method, ASTM designation D908. This method is commonly referred to as the Research method. Antiknock values obtained by the Research method are generally higher than antiknock values obtained by the Motor method. The difference between the two ratings is known as the sensitivity of the fuel.

Considerable work has been done to relate data obtained by these laboratory methods with the performance of fuels in cars on the road. Performance of fuel in different makes and models of cars show significant variations; hence, it is obvious that no exact correlation can be developed. In general, when operating an automotive spark ignition internal combustion engine under conditions of low speed, especially at speeds below about twenty-five miles per hour, Research octane number is a better criterion than the Motor octane number of the antiknock performance of the fuel. Similarly it is generally observed that at higher speeds, above about fifty miles per hour, the Motor octane number is the better criterion of the antiknock performance of the fuel.

The automotive engine is the type of spark ignition internal combustion engine which is best known and in the past has been designed with compression ratios in the range of about 5:1 to 7:1. Such engines require motor fuel with an octane number rating in the range of about 60 to 80 as determined by the Motor method. Recently designed automotive engines have higher compression ratios ranging up to about 12.5:1. There are indications that the performance of many of these newer engines correlate best with the Research octane rating of the fuel. The higher compression ratio engines require fuels having Research octane ratings of well over 100. It is obvious, therefore, that the octane rating of motor fuels must be increased so as to meet the increasing demand of engine design. A fuel of higher octane rating for the newer types of engines requires the blending of more select stocks comprising isoparaffins and cycloparaffins. However, these same stocks are also essential for aviation fuels which have a still higher octane number requirement. Increasing the sensitivity of a fuel also requires select stocks, such as the catalytically cracked stocks.

We have discovered that the Motor octane number of a motor fuel may be increased by 3 to 10 octane numbers and the Research octane number by 4 to 12 octane numbers by the addition of monoisopropylamine to a motor fuel base.

Automotive engines usually operate without supercharge and under lean mixture conditions, i. e., fuel-air ratios of less than .08 and ranging downwardly to about .07. The modern aircraft engines operate under supercharged conditions and obtain maximum power output with rich mixtures, i. e., with fuel-air ratios greater than .08 and frequently as high as .12. In the past it has been found that certain aromatic hydrocarbons, such as benzene, toluene, and cumene, will greatly improve the rich mixture antiknock performance in aircraft engines. Usually, however, that improvement is obtained with a concomitant lowering of lean mixture performance. It has also been necessary to increase the quantity of antiknock additives, such as tetraethyl lead, to as much as 6 cc. per gallon in order to produce superior aviation fuels. With these aviation engines, it has been found that the fuel distribution is a critical factor in determining the knock limited performance. "Knock limited performance," as used herein is the maximum horsepower output obtainable with a given fuel in an aviation-type, spark ignition, internal combustion engine under specific operating conditions that will not result in knocking. This is to be distinguished from "knock limited performance" as used in the automotive industry, wherein it means the horsepower reached at a point where power falls due to knocking. For maximum power output the engine must operate with a rich fuel-air ratio, but frequently the majority of cylinders will be operating under this condition while the knock limited power output is being determined by one or more cylinders operating under lean mixture conditions. The heavier or higher boiling aromatic fractions which have been added to the fuel to improve its rich mixture performance together with a major portion of the tetraethyl lead have a tendency to pass into the cylinders nearer the carburetor and thus the more remote cylinders actually receive a fuel of lowered rich mixture rating but also operate under relatively leaner fuel-air ratios. Therefore, it is highly desirable to provide an aviation fuel which has both a high lean and high rich mixture rating. Such a fuel is still more desirable if the components which enhance both the lean and rich mixture rating are concentrated in the first 50 per cent of the distillation range of the fuel. Thus, when an aircraft engine is operated with such a fuel these components will be more uniformly distributed to all of the cylinders of the engine.

We have discovered that monoisopropylamine as a fuel component has an excellent octane number and supercharge rating and that a fuel boiling in the gasoline boiling range and comprising essentially hydrocarbons and monoisopropylamine has a superior octane number and supercharge rating as compared to the hydrocarbon material. Even very small quantities of monoisopropylamine in hydrocarbons provides an improvement in octane number and supercharge rating. We have further discovered that a fuel boiling in the gasoline boiling range, generally between 90° F. and 420° F., comprising essentially between 80 per cent and 99 per cent by volume hydrocarbons boiling within the range of between —40° F. and 430° F., desirably contains between 1 per cent and 20 per cent by volume monoisopropylamine for improvement of octane number and supercharge ratings which are so desirable for modern engine fuels. It is preferred to utilize between 5 and 20 per cent by volume of isopropylamine in between 80 per cent and 95 per cent by volume of the hydrocarbon stock boiling within the gasoline range. The amount of hydrocarbon boiling below 90° F. which is utilized in our fuel composition is dependent upon the desired vapor pressure. The octane number of our fuel is also considerably improved by the addition of minor amounts of antiknock additives, such as from 1 to 7 ml. TEL per gallon of fuel.

The advantages which may be obtained by operating a spark ignition internal combustion engine with the fuel of our invention and in the method above described will be apparent upon study of the Motor octane number ratings and Research octane number ratings which were made on motor vehicle fuels set forth below in Table III and of the 1–C (octane number) ratings and 3–C (supercharge) ratings of aviation gasolines which are set forth below in Table VI. The physical and chemical properties of automotive fuels upon which tests were run are set forth in Table I below.

Table I

| Base | Base, percent | Monoisopropylamine, percent | RVP | API Gravity | Evaporated Temperature, °F. (29.92 inches Mercury) | | | | | | | Percent Evaporated at 212° F. |
|---|---|---|---|---|---|---|---|---|---|---|---|---|
| | | | | | IBP | 10 | 40 | 50 | 70 | 90 | EP | |
| A | 100 | | 5.05 | 59.3 | 106 | 163 | 231 | 249 | 288 | 350 | 407 | 31.0 |
| A | 95 | 5 | 5.10 | 60.0 | 102 | 141 | 222 | 243 | 286 | 348 | 404 | 36.0 |
| A | 90 | 10 | 5.95 | 60.7 | 99 | 125 | 213 | 238 | 280 | 346 | 402 | 39.8 |

Physical and chemical properties of aviation fuels on which 1–C and 3–C ratings have been obtained are set forth in Table II below.

Table II

| Base | Base, percent | Monoisopropylamine, percent | RVP | API Gravity | Evaporated Temperature, ° F. (29.92 inches Mercury) | | | | | Percent Evaporated at 167° F. |
|---|---|---|---|---|---|---|---|---|---|---|
| | | | | | IBP | 10 | 50 | 90 | EP | |
| B | 100 | | 7.05 | 71.7 | 113 | 138 | 181 | 251 | 373 | 39.5 |
| C | 100 | | 6.90 | 71.9 | 111 | 139 | 181 | 254 | 379 | 39.0 |
| B | 95 | 5 | 7.75 | 71.9 | 102 | 126 | 178 | 252 | 362 | 42.8 |
| C | 90 | 10 | 8.60 | 72.8 | 97 | 118 | 171 | 249 | 367 | 47.8 |

Motor octane number and Research octane number ratings were made with an automotive fuel with no TEL and with 1, 2, and 3 ml. TEL per gallon. Like tests were made with a fuel which consisted of 95 per cent of the base fuel without TEL and with 5 per cent monoisopropylamine. Motor octane number and Research octane number ratings were also made of that fuel after 2.9 ml. TEL per gallon had been added. Another fuel consisting of 90 per cent of base stock A and 10 per cent monoisopropylamine but having no TEL was rated as to Motor octane number and Research octane number. Similar ratings were made of that fuel after 2.9 TEL per gallon had been added to the fuel. Those ratings are set forth below in Table III.

*Table III*

| Base | Base, percent | Monoisopropylamine, percent | Motor Octane No., ml. TEL/gal. | | | | Research Octane No., ml. TEL/gal. | | | | Motor Octane No., 2.9 ml. TEL./gal. | Research Octane No., 2.9 ml. TEL/gal. |
|---|---|---|---|---|---|---|---|---|---|---|---|---|
| | | | 0 | 1 | 2 | 3 | 0 | 1 | 2 | 3 | | |
| A | 100 | | 58.8 | 67.1 | 71.0 | 73.8 | 62.6 | 70.9 | 75.6 | 78.4 | | |
| A | 95 | 5 | 63.6 | | | | 68.0 | | | | 77.1 | 82.5 |
| A | 90 | 10 | 67.8 | | | | 74.2 | | | | 80.0 | 86.4 |

The addition of 5 per cent isopropylamine to the unleaded gasoline provided a substantial increase in both Motor and Research octane numbers. An additional improvement was obtained upon the addition of 10 per cent isopropylamine to the unleaded gasoline. Considerably higher Motor and Research octane number ratings were obtained upon the addition of 2.9 ml. TEL per gallon to the fuels containing the isopropylamine than were obtained with the base fuel containing 3 ml. TEL per gallon.

1-C number ratings and 3-C lean and rich ratings were made using two base aviation fuels. The fuels in each instance contained 4.0 ml. TEL per gallon. The 3-C lean and rich ratings were based upon a high octane reference fuel, the properties of which are set forth below in Table IV.

*Table IV*

Octane No.:
Aviation _____ 99.8
Motor _____ 99.6

Gravity, specific, $d_4^{20}$ _____ 0.6920
Sulfur, per cent _____ 0.006
Accelerated gum, mg _____ 1
Freezing point, °C _____ −107.64
Unsaturation, mg. bromine _____ 1.4
Aromatic amine _____ Neg.
Distillation, °F.:
IBP _____ 208
10% _____ 209
90% _____ 211
FBP _____ 225
Recovery, per cent _____ 99.0
Residue, per cent _____ 0.6

The 3-C lean mixture supercharge rating which was obtained on the fuel consisting of 95 per cent of base stock B and 5 per cent monoisopropylamine with 4.0 ml. TEL is expressed in terms of the percentage of a fuel, the properties of which are set forth in Table IV, in a standard low octane reference fuel, the properties of which are set forth in Table V below.

*Table V*

Octane No.:
Motor _____ 19.6
Research _____ 17.0
Gravity, API ° _____ 61.3
Sulfur, per cent _____ 0.016
ASTM acid heat, °F _____ 3
RVP, p. s. i. _____ 3.3
ASTM gum, mg _____ 1.2
Copper dish gum, mg _____ 1.4
Breakdown time, min _____ 360+
Distillation, °F.:
IBP _____ 134
5% _____ 185
10% _____ 201
50% _____ 272
90% _____ 352
95% _____ 369
FBP _____ 386
Recovery, per cent _____ 98.5
Loss, per cent _____ 0.7

Each of the 1-C ratings which was made with the fuel containing monoisopropylamine was much higher than the corresponding rating made of the base stock containing no monoisopropylamine. The same is true of each of the 3-C rich ratings made of the fuels containing monoisopropylamine as is shown in Table VI below.

*Table VI*

| Base | 87 Octane No. iC$_8$ | iC$_7$ | iC$_6$ | 98% purity iC$_5$ | Base | Monoisopropylamine | 1-C (F-3) Rating, 4.0 ml. TEL | 3-C (F-4) Rating, 4.0 ml. TEL Lean | 3-C (F-4) Rating, 4.0 ml. TEL Rich |
|---|---|---|---|---|---|---|---|---|---|
| | Percent | Percent | Percent | Percent | Percent | Percent | | | |
| B | 37.1 | 23.1 | 23.8 | 16.0 | 100 | | [1] 0.007 | [2] 0.09 | [2] 0.32 |
| C | 36.6 | 21.8 | 25.3 | 16.3 | 100 | | [1] 0.007 | [2] 0.08 | [2] 0.36 |
| B | | | | | 95 | 5 | [1] 0.035 | [3] 99.50 | [2] 0.39 |
| C | | | | | 90 | 10 | [1] 0.065 | | [2] 0.58 |

[1] Indicates the ml. of TEL per gallon of isooctane reference fuel.
[2] Indicates the ml. of TEL per gallon in the high octane fuel of Table IV.
[3] Percentage of the fuel of Table IV in the fuel of Table V.

The superiority of our spark ignition internal combustion engine fuel over conventional spark ignition internal combustion fuels is believed to be quite apparent upon study of the above tables. It will be obvious to those skilled in the art that many modifications in specific fuel composition may be made without departing from the spirit or the scope of the disclosure.

We claim:

1. A composition of matter boiling in the gasoline boiling range and consisting essentially of gasoline; a small proportion of tetraethyl lead;

and between 1 per cent and 20 per cent by volume of monoisopropylamine.

2. A composition of matter boiling in the gasoline boiling range consisting essentially of between 80 per cent and 99 per cent by volume of gasoline constituents boiling in the range of between −40° F. and 430° F.; between 1 ml. and 7 ml. tetraethyl lead per gallon; and between 1 per cent and 20 per cent by volume of monoisopropylamine.

3. A composition of matter boiling within the gasoline boiling range and consisting essentially of between 80 per cent and 95 per cent by volume of gasoline; between 5 per cent and 20 per cent by volume monoisopropylamine; and between 1 ml. and 7 ml. tetraethyl lead per gallon.

4. A composition of matter boiling in the gasoline boiling range consisting essentially of between 1 per cent and 20 per cent by volume of monoisopropylamine; up to 7 ml. tetraethyl lead per gallon; and gasoline having a leaded motor octane number of at least 99.

5. A composition of matter boiling in the gasoline boiling range, consisting essentially of between 1 per cent and 20 per cent by volume of monoisopropylamine up to 7 ml. tetraethyl lead per gallon; and gasoline having a clear ASTM motor octane number sufficiently high that when raised by the addition of said monoisopropylamine, the ASTM motor octane number of said composition of matter is at least 80.

HAROLD M. TRIMBLE.
LEO A. McREYNOLDS.
BILL MITACEK.

References Cited in the file of this patent

UNITED STATES PATENTS

| Number | Name | Date |
|---|---|---|
| 2,324,118 | Sweeney | July 13, 1943 |

FOREIGN PATENTS

| Number | Country | Date |
|---|---|---|
| 318,352 | Italy | June 11, 1934 |